Dec. 8, 1925.

T. W. MOORE 1,564,608

STEERING WHEEL ATTACHMENT

Filed March 11, 1925

INVENTOR.
Thurston W. Moore
BY M. C. Frank
ATTORNEY.

Patented Dec. 8, 1925.

1,564,608

UNITED STATES PATENT OFFICE.

THURSTON W. MOORE, OF OAKLAND, CALIFORNIA.

STEERING-WHEEL ATTACHMENT.

Application filed March 11, 1925. Serial No. 14,766.

*To all whom it may concern:*

Be it known that I, THURSTON W. MOORE, a citizen of the United States, residing at Oakland, in the county of Alameda and State of California, have invented certain new and useful Improvements in Steering-Wheel Attachments, of which the following is a specification.

My invention relates in general to automobile accessories, and has particular reference to a combination smoker's article for use in connection with the steering wheel of automobiles, motor boats and the like vehicles.

While smoker's articles for automobiles are already in use to a limited extent, these heretofore adapted devices have usually been confined to a cigar or cigarette lighter as a dash or instrument board attachment, and perhaps an ash receiver has also been carried by the instrument board, and in some instances these devices have been mounted to the uprights in a closed car body structure. None of the devices have served as a compact and altogether convenient attachment, especially for the driver, as they are more or less out of his reach when driving. Then again they fail to offer a combined or assembled unit in which will be found practically all the necessary devices required by a smoker.

Having in mind the disadvantages of these heretofore accepted devices, it is my purpose to supply all necessary smoker's articles in a combined unit assembly, and, without requiring the permanent removal of any of the parts whereby the steering wheel is attached to the steering column of an automobile, to mount the articles upon the steering wheel in such a manner that they will be within convenient reach of the driver.

Another object of my invention is one of safety, namely, to eliminate the necessity of the driver reaching out his arm to flick the ashes from his cigar, or perhaps he may flick them inside the car, both are dangerous. In the first instance a driver in a following car may think the extended arm was meant for a signal and this is equivalent to an unnecessary annoyance, a false signal.

The novel features of my invention can best be explained with reference to the illustration shown in the accompanying drawing, in which.

Figure 1:
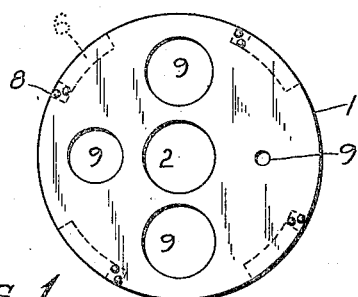
Figure 1 is a plan of one embodiment of the plate member of the device.
Figure 2:
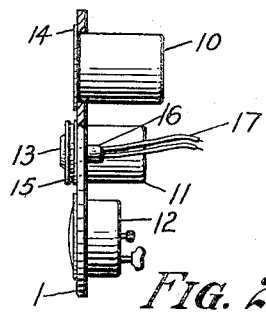
Fig. 2 is an edge view of it with the articles assembled thereon. Part is in section to show a flange seating.
Figure 3:
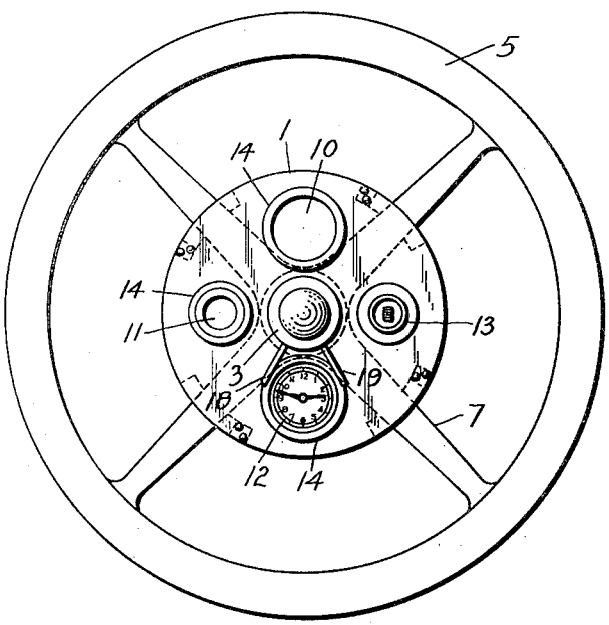
Fig. 3 is a plan of the assembly showing its application to a steering wheel.
Figure 4:
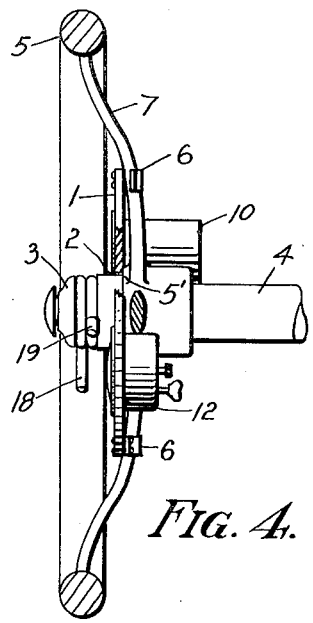
Fig. 4 is a sectional view of the wheel and assembly with part of the plate broken away to show its fitted connection upon the head of the steering column.
Figure 5:
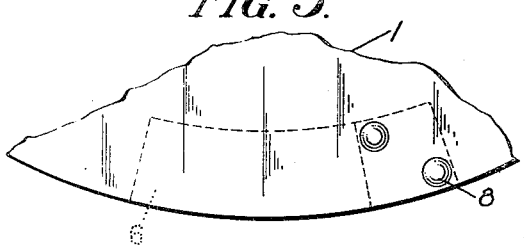
Fig. 5 is a detail view in plan, on an enlarged scale, of the plate member with one of the securing clips shown in dotted lines.

Referring now to the drawing in detail: I propose to construct the supporting member of the device in the form of a relatively large disk 1, and to produce the same from any material suitable for the purpose, perhaps bakelite, hard rubber, fiber, metal or the like.

The disk 1 in its preferred form will be made with a large central opening 2 of a dimension to fit snugly around the head 3 of the steering column 4, and rest upon the steering wheel 5. In order to provide a rigid attachment of the disk to the wheel, I suggest the use of some means, preferably a series of spaced clips 6, for engaging the spokes 7 of the wheel 5. I prefer resilient clips of metal such as shown, and believe them to be the simplest means of accomplishing the purpose, and the same may be mounted to the disk 1 by rivets or the like 8, and further, so formed that they will frictionally engage the usual four spokes of the wheel by turning the disk clockwise after the same has been slipped over the head of the steering column. Most makes of automobiles have the spark and gas levers 18 and 19 positioned in the head of the steering column, but this need not interfere with the application of my attachment, since the opening 2 in the disk may be slipped over the levers and column and then seated on the steering wheel without difficulty.

Figure 7:
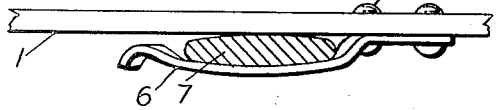
Fig. 7 is a detail view in section showing the application of a modified form of connection of the invention.
Figure 6:
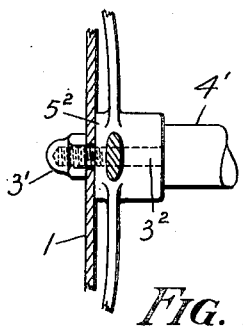
Fig. 6 is an edge view of it and showing the clip in engagement with a spoke of the steering wheel.

As a slight modification I may in some instances do away with the clips 6, since in some steering columns as 4' (Fig. 7), the head is simply completed with an acorn nut 3', which is threaded upon the projecting end of the steering wheel mounting $3^2$.

In this case I will make the opening 2 to fit the projecting end of the mounting 3² and rely upon the steering wheel hub 5² to serve as an abutment for the securement of the disk thereto. This is also true in the other form since the head 3 of the column 4 is smaller in diameter than the hub 5' of the wheel 5.

In all forms of the disk I provide the same with a plurality of receptacle or the like receiving openings 9. In the illustration I have selected four, one for a cigarette or cigar holder 10, one for an ash receiving receptacle 11, one for a clock 12, and the fourth for a lighter 13 of the electrical type. The receptacles including the clock, are made relatively deep so that they may be snugly fitted in the openings. The rim or flange 14 of each receptacle limits the insertion of the receptacle in the disk. The rimmed case 15 for the lighter 13 has a sleeve 16 which projects into the small opening made to receive it. 17 represents the wires from the lighter to the current source.

With an assembly such as described, the driver may safely drive, as he is not required to search his pockets for cigarettes, cigars or matches, and when smoking, the ashes may be conveniently flicked into the receiver 11. Then again having the clock in such a convenient location is an advantage also. The entire assembly may be sold as a single unit, and the simplicity of the same makes it an efficient article and a most attractive purchase for the autoist.

What I claim as new and desire to secure patent protection thereon in the United States is the following:

1. In a device of the class described, a disk having a central opening adapted to be received over the head of the steering column of a vehicle for mounting the disk upon the steering wheel; and means secured to the underside of the disk at its circumference for attaching the disk to the steering wheel, the said means not being visible from the top side of the disk.

2. In a device of the class described, a disk having a central opening adapted to be received over the head of the steering column of a vehicle for mounting the disk upon the steering wheel; and clips secured to the underside of the disk and adapted to engage the underside of the spokes of the steering wheel and to be snapped into position on said spokes for securing the disk to the steering wheel by the turning of the disk after it has been slipped over said head.

3. In a device of the class described, a disk having a central opening adapted to be received over the head of the steering column of a vehicle for mounting the disk upon the steering wheel; and resilient clips secured in spaced relation to the underside of the disk and adapted to engage the underside of the spokes of the steering wheel and to be snapped into position on said spokes for securing the disk to the steering wheel by the turning of the disk after it has been slipped over said head.

4. In a device of the class described, a disk having a central opening adapted to be received over the head of the steering column of a vehicle for mounting the disk upon the steering wheel, said disk having a plurality of openings adapted to register with the spaces between the spokes of said wheel and to hold receptacles therein; and resilient clips arranged in spaced relation so as to register with said spokes, said clips being secured to the underside of the disk and adapted to engage the underside of the spokes and to be snapped into position on said spokes for securing the disk to the steering wheel by the turning of the disk after it has been slipped over said head.

5. In a device of the character described, a disk having a central opening adapted to be received over the head of the steering column of a vehicle for mounting the disk upon the steering wheel, said disk having a plurality of openings adapted to register with the spaces between the spokes of said wheel; receptacles in said openings, said receptacles being adapted to hold smokers' articles therein; and resilient clips arranged in spaced relation so as to register with said spokes, said clips being secured to the underside of the disk and adapted to engage the underside of the spokes and to be snapped into position on said spokes for securing the disk to the steering wheel by the turning of the disk after it has been slipped over said head.

In testimony whereof, I affix my signature.

THURSTON W. MOORE.